(12) United States Patent
Paterson-Jones et al.

(10) Patent No.: US 8,856,483 B1
(45) Date of Patent: Oct. 7, 2014

(54) VIRTUAL DATA STORAGE SERVICE WITH SPARSE PROVISIONING

(75) Inventors: Roland Paterson-Jones, Cape Town (ZA); Sachin Jain, Issaquah, WA (US); Tate Andrew Certain, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 899 days.

(21) Appl. No.: 12/886,738

(22) Filed: Sep. 21, 2010

(51) Int. Cl.
  *G06F 12/14* (2006.01)
(52) U.S. Cl.
  USPC ............................. 711/171; 711/170; 711/203
(58) Field of Classification Search
  CPC .. G06F 12/023; G06F 12/109; G06F 12/1027
  USPC .......................................... 711/171, 170, 203
  See application file for complete search history.

(56) References Cited

U.S. PATENT DOCUMENTS

| 7,299,468 | B2 * | 11/2007 | Casey et al. ................... | 718/104 |
| 7,447,838 | B2 * | 11/2008 | Aoyama ....................... | 711/114 |
| 2004/0194089 | A1 * | 9/2004 | McCarthy et al. ............ | 718/100 |

* cited by examiner

*Primary Examiner* — Jae Yu
(74) *Attorney, Agent, or Firm* — Novak Druce Connolly Bove + Quigg, LLP (57) ABSTRACT

Virtual data stores may be sparsely provisioned by virtual data storage services in a manner that controls risk of implementation resource shortages. Relationships between requested data storage space size, data storage server capacity, allocated data storage space size and/or allocated data storage space utilization may be tracked on a per data store, per customer, per data storage server, and/or a per virtual data storage service basis. For each such basis, a set of constraints may be specified to control the relationships. The set of constraints may be enforced during implementation resource allocation, and by migration of data storage space portions to different implementation resources as part of a sparse provisioning load balancing. Sparse provisioning details may be made explicit to virtual data storage service customers to varying degrees including explicit, aggregate on a per customer basis, and aggregate on a per virtual data storage service basis.

16 Claims, 7 Drawing Sheets

Figure 7 though a Web-based environment may be utilized for purposes of explanation, different environments may be utilized, as appropriate, to implement various embodiments. The environment 100 shown includes both a

VIRTUAL DATA STORAGE SERVICE WITH SPARSE PROVISIONING

BACKGROUND

Virtual data storage services have become available that enable customers of the services to provision virtual data stores of various kinds without concern for the hardware that implements and maintains the virtual data stores. The implementation hardware and suitable associated facilities, such as network connectivity, are financed and maintained by the virtual data storage service operators. In return, the operators charge customers according to various cost plans, typically including at some costs that are based on virtual data store size (e.g., as measured in gigabytes).

It is common for customers of such virtual data storage services to over-provision with respect to current data storage needs in anticipation of increased future data storage needs. Since modern virtual data storage services can rapidly provision additional data storage space (e.g., on the order of minutes, seconds or less), this is an inefficiency that can result in significant additional cost to virtual data storage service operators and/or their customers. However, not all customers over-provision, and customers that do over-provision do so to different extents. Accordingly, poor assumptions about customer over-provisioning can be problematic.

BRIEF DESCRIPTION OF THE DRAWINGS

Various embodiments in accordance with the present disclosure will be described with reference to the drawings, in which.

Same numbers are used throughout the disclosure and figures to reference like components and features, but such repetition of number is for purposes of simplicity of explanation and understanding, and should not be viewed as a limitation on the various embodiments.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Virtual data stores may be sparsely provisioned by virtual data storage services in a manner that controls risk of implementation resource shortages, for example, due to sudden spikes in demand. Customers of a virtual data storage service in accordance with at least one embodiment may request that the virtual data storage service provision data stores of various sizes. The virtual data storage service may assess the requests with respect to various utilization metrics and, for at least some of the requests, may determine that the associated data store may be allocated initial implementation resources (e.g., hard drive disk space) that maintain a data storage space of a size less than the requested size.

Relationships (e.g., ratios) between requested data storage space size, data storage server capacity, allocated data storage space size and/or allocated data storage space utilization may be tracked on a per data store, per customer, per data storage server, and/or a per virtual data storage service basis. For each such basis, a set of constraints ("sparse provisioning constraints") may be specified to control the relationships. Such control may reduce a risk that a sudden spike in activity (e.g., writes of data to previously unwritten portions of a data storage space) results in a performance degradation while additional implementation resources are made available. The set of constraints may be enforced during implementation resource allocation and/or re-allocation (collectively, "allocation"), and by migration of data storage space portions to different implementation resources as part of a sparse provisioning load balancing.

Various activity (e.g., rates of data consumption, rates of data change) with respect to data storage spaces may be monitored, and implementation resource allocations adjusted in accordance. As well as distinctions between active and inactive portions of a data storage space (i.e., between portions of the data storage space written at least once and not written since provisioning, respectively), access and/or update frequencies of data in active portions of the data storage space (the "active storage space") may be tracked. Hot and cold regions of the active storage space (i.e., frequently and infrequently accessed and/or updated regions, respectively) may be identified, and cold regions may be transferred to lower performance and/or lower cost implementation resources.

Sparse provisioning details may be made explicit to virtual data storage service customers to varying degrees including explicit, aggregate on a per customer basis, and aggregate on a per virtual data storage service basis. A customer may be presented with an explicit inventory of portions of a provisioned virtual data store that are unallocated, inactive, active, hot and/or cold, and the customer's cost plan may specify different costs associated with each status. Alternatively, the customer may be presented with various representative sparse provisioning metrics for one or more sets of virtual data store provisioned by the customer such as "percent active", and the customer's cost plan may apply various sparse provisioning discounts (e.g., corresponding to sparse provisioning metric thresholds) when sparse provisioning is authorized by the customer. As a further alternative, the virtual data storage service operator may incorporate sparse provisioning cost efficiencies into pricing of the service as a whole.

Figure 1:
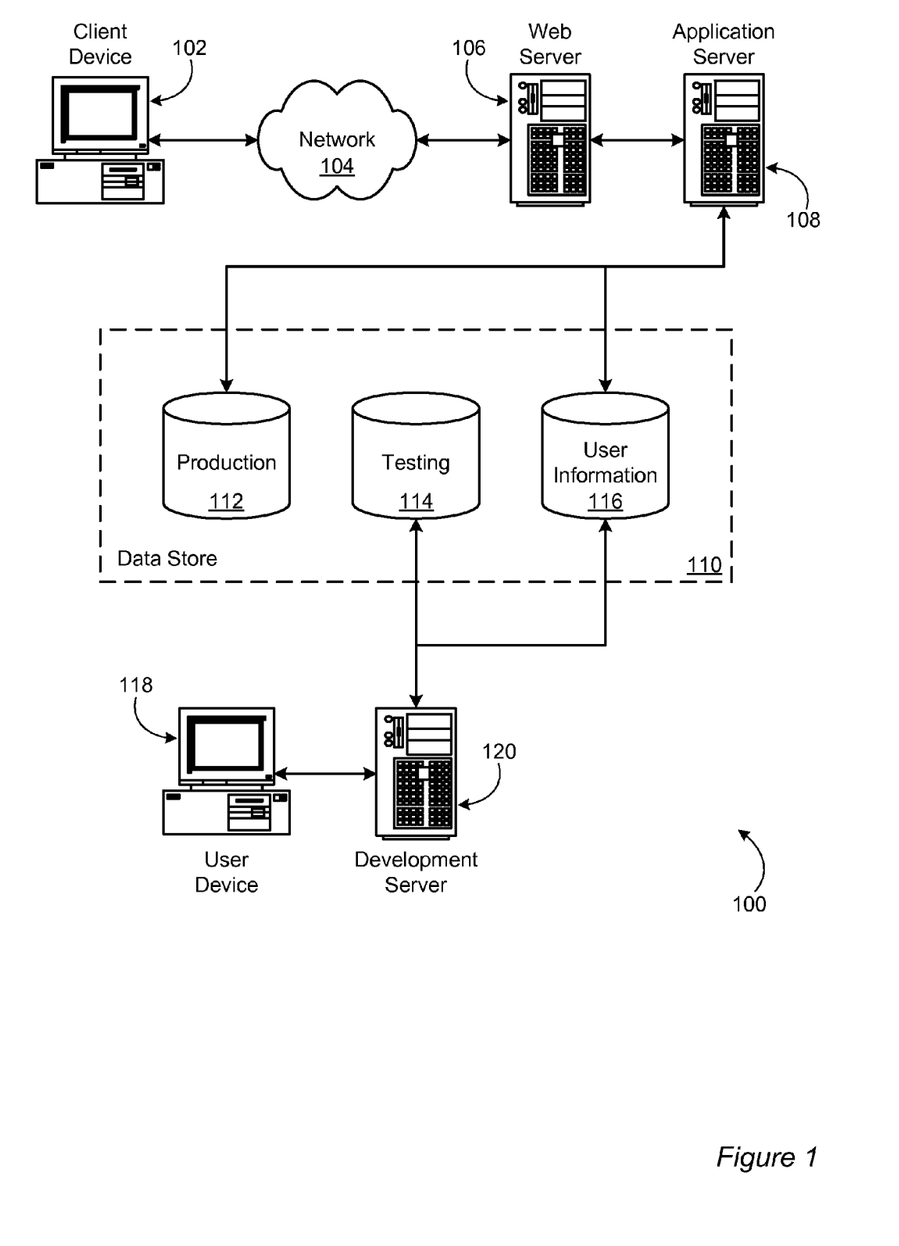
FIG. 1 is a schematic diagram illustrating an example environment for implementing aspects in accordance with at least one embodiment.

Various approaches may be implemented in various environments for various applications. For example, FIG. 1 illustrates aspects of an example environment 100 for implementing aspects in accordance with various embodiments. As will be appreciated, although a Web-based environment may be utilized for purposes of explanation, different environments may be utilized, as appropriate, to implement various embodiments. The environment 100 shown includes both a testing or a development portion (or side) and a production portion. The production portion includes an electronic client device 102, which may include any appropriate device operable to send and receive requests, messages, or information over an appropriate network 104 and convey information back to a user of the device 102. Examples of such client devices include personal computers, cell phones, handheld messaging devices, laptop computers, tablet computers, set-top boxes, personal data assistants, electronic book readers, and the like.

The network 104 may include any appropriate network, including an intranet, the Internet, a cellular network, a local area network, a wide area network, a wireless data network, or any other such network or combination thereof. Components utilized for such a system may depend at least in part upon the type of network and/or environment selected. Protocols and components for communicating via such a network are well known and will not be discussed herein in detail. Communication over the network may be enabled by wired or wireless connections, and combinations thereof. In this example, the network 104 includes the Internet, as the environment includes a Web server 106 for receiving requests and serving content in response thereto, although for other networks an alternative device serving a similar purpose could be utilized as would be apparent to one of ordinary skill in the art.

The illustrative environment 100 includes at least one application server 108 and a data store 110. It should be understood that there may be several application servers, layers, or other elements, processes, or components, which may be chained or otherwise configured, which may interact to perform tasks such as obtaining data from an appropriate data store. As used herein the term "data store" refers to any device or combination of devices capable of storing, accessing, and/or retrieving data, which may include any combination and number of data servers, databases, data storage devices, and data storage media, in any standard, distributed, or clustered environment.

The application server 108 may include any appropriate hardware and software for integrating with the data store as needed to execute aspects of one or more applications for the client device 102, and may even handle a majority of the data access and business logic for an application. The application server 108 provides access control services in cooperation with the data store 110, and is able to generate content such as text, graphics, audio, and/or video to be transferred to the user, which may be served to the user by the Web server 106 in the form of HTML, XML, or another appropriate structured language in this example.

The handling of all requests and responses, as well as the delivery of content between the client device 102 and the application server 108, may be handled by the Web server 106. It should be understood that the Web and application servers 106, 108 are not required and are merely example components, as structured code discussed herein may be executed on any appropriate device or host machine as discussed elsewhere herein. Further, the environment 100 may be architected in such a way that a test automation framework may be provided as a service to which a user or application may subscribe. A test automation framework may be provided as an implementation of any of the various testing patterns discussed herein, although various other implementations may be utilized as well, as discussed or suggested herein.

The environment 100 may also include a development and/or testing side, which includes a user device 118 allowing a user such as a developer, data administrator, or tester to access the system. The user device 118 may be any appropriate device or machine, such as is described above with respect to the client device 102. The environment 100 may also include a development server 120, which functions similar to the application server 108 but typically runs code during development and testing before the code is deployed and executed on the production side and becomes accessible to outside users, for example. In some embodiments, an application server may function as a development server, and separate production and testing storage may not be utilized.

The data store 110 may include several separate data tables, databases, or other data storage mechanisms and media for storing data relating to a particular aspect. For example, the data store 110 illustrated includes mechanisms for storing production data 112 and user information 116, which may be utilized to serve content for the production side. The data store 110 also is shown to include a mechanism for storing testing data 114, which may be utilized with the user information for the testing side. It should be understood that there may be many other aspects that are stored in the data store 110, such as for page image information and access right information, which may be stored in any of the above listed mechanisms as appropriate or in additional mechanisms in the data store 110.

The data store 110 is operable, through logic associated therewith, to receive instructions from the application server 108 or development server 120, and obtain, update, or otherwise process data in response thereto. In one example, a user might submit a search request for a certain type of item. In this case, the data store 110 might access the user information 116 to verify the identity of the user, and may access the catalog detail information to obtain information about items of that type. The information then may be returned to the user, such as in a results listing on a Web page that the user is able to view via a browser on the user device 102. Information for a particular item of interest may be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment 100 in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limiting to the scope of the disclosure.

Figure 2:
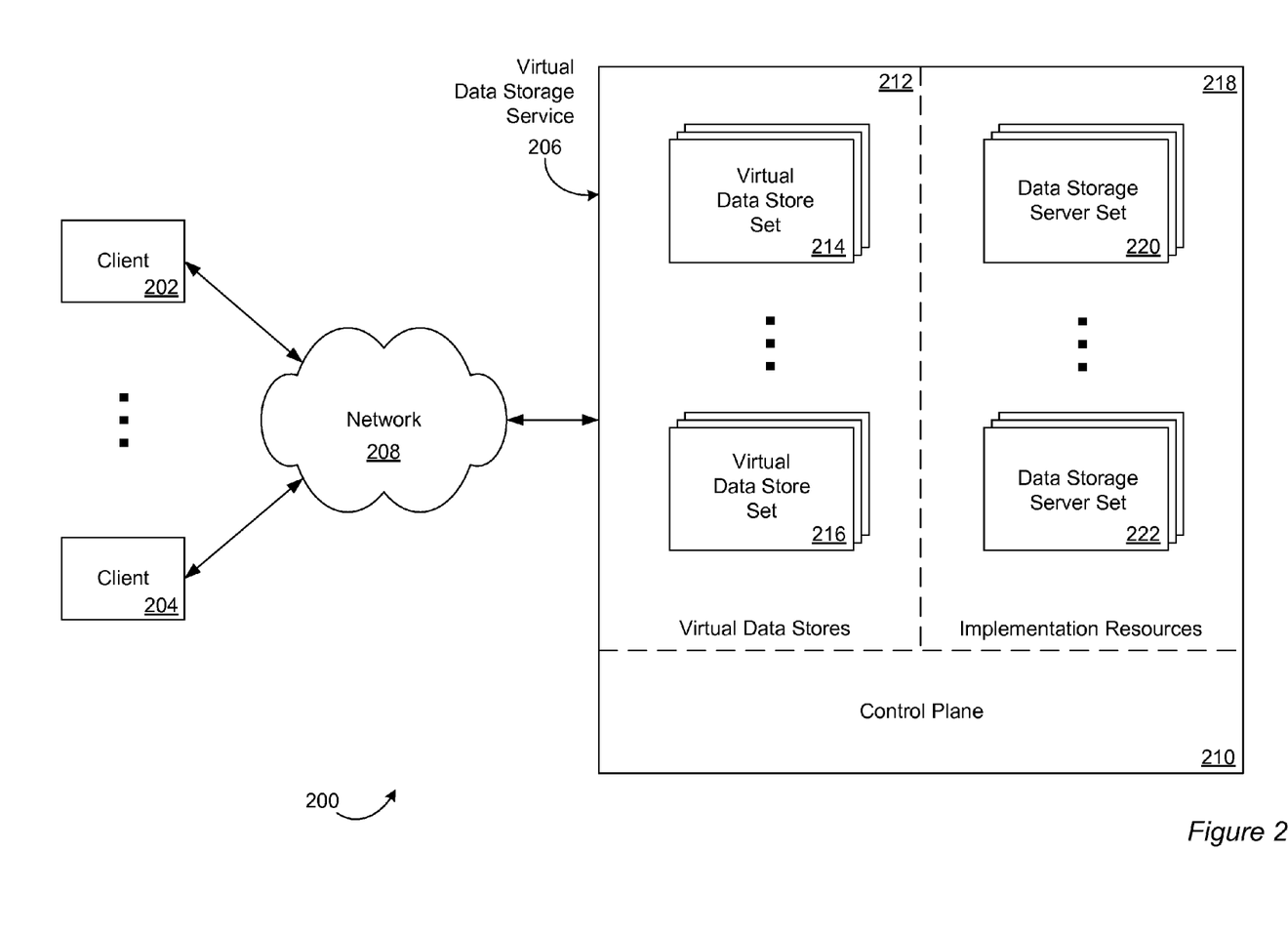
FIG. 2 is a schematic diagram depicting aspects of an example virtual data store service architecture in accordance with at least one embodiment.

In at least one embodiment, one or more aspects of the environment 100 may incorporate and/or be incorporated into a virtual data store service architecture. FIG. 2 depicts aspects of an example virtual data store service architecture 200 in accordance with at least one embodiment. The example virtual data store service architecture 200 includes multiple clients 202-204 communicatively connected to a virtual data store service 206 over a network 208. For example, the clients 202-204 may corresponding to computing devices such as the computing device 102 of FIG. 1 and/or client programs incorporated into such computing devices. The ellipsis between the client 202 and the client 204 indicates that the virtual data store service architecture 200 may include any suitable number of clients (e.g., thousands, millions, and more) although, for clarity, only two are shown in FIG. 2.

One or more of the clients 202-204 may be utilized by one or more customers of the virtual data store service 206 to interact with a control plane 210 of the virtual data store service 206, and thereby provision one or more virtual data stores 212. Alternatively, or in addition, one or more of the clients 202-204 may be utilized (not necessarily by virtual data store service 206 customers) to interact with provisioned virtual data stores 212. The provisioned virtual data stores 212 may include any suitable type of virtual data store. Examples of suitable types of virtual data store include virtual data stores that emulate block devices including virtual file systems and/or virtual volumes thereof, virtual data stores having Web-service type interfaces, virtual data stores having database type interfaces such as relational database (RDBMS) type interfaces, virtual data stores having custom interfaces, and suitable combinations thereof. FIG. 2 depicts multiple virtual data store sets 214-216. For example, each set of virtual data stores 214-216 may correspond to a different type of virtual data store. The ellipsis between the virtual data store set 214 and the virtual data store set 216 indicates that the virtual data stores 212 may include any suitable number of sets and/or types of virtual data store although, for clarity, only two are shown in FIG. 2.

The virtual data store service 206 may include any suitable implementation resources 218. Each of the virtual data stores 212 may be implemented by a set of the implementation resources 218. For example, the implementation resources 218 may include multiple sets of data storage server computers 220-222. Each set of data storage servers 220-222 may be dedicated to implementing a particular type of virtual data store. Alternatively, or in addition, different sets of data storage servers 220-222 may have different performance and/or cost characteristics. For example, the data storage server set 220 may include high performance and/or cost data storage servers relative to data storage servers in the data storage server set 222. The control plane 210 may process virtual data store provisioning requests, manage allocation of virtual data stores 212 to implementation resources 218 and/or manage allocation of implementation resources 218 to virtual data stores 212, as well as provide for associated cost accounting services.

Figure 3:
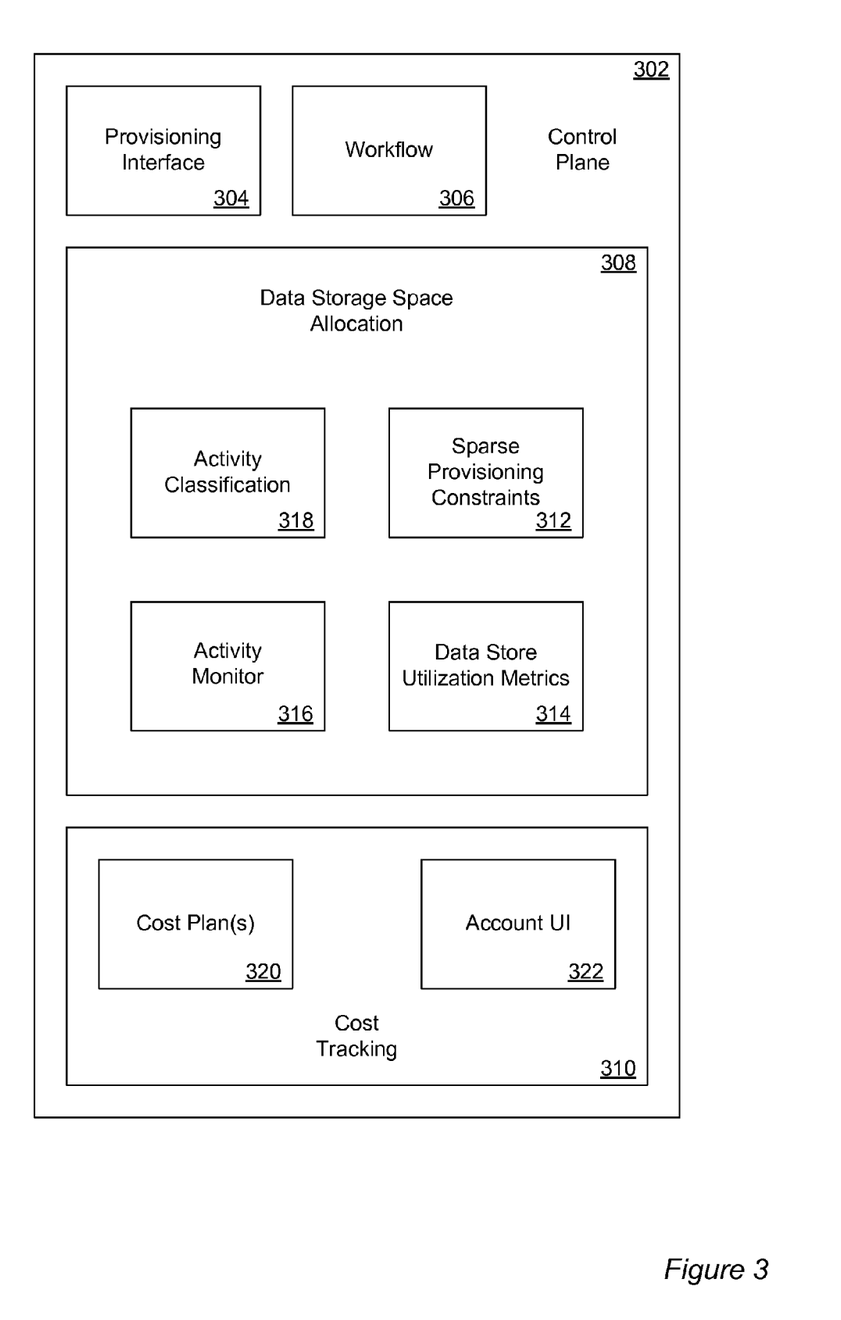
FIG. 3 is a schematic diagram depicting aspects of an example control plane in accordance with at least one embodiment.

Provisioning, configuration, re-configuration, and/or de-provisioning (collectively, "provisioning") of virtual data stores may be controlled by the control plane 210 (FIG. 2) of the virtual data store service 206. FIG. 3 depicts aspects of an example control plane 302 in accordance with at least one embodiment. The control plane 302 of FIG. 3 is an example of the control plane 210 of FIG. 2. The control plane 302 may include a provisioning interface 304 configured at least to receive virtual data store 212 provisioning requests from one or more of the clients 202-204, a workflow component 306 configured at least to guide responses to provisioning requests in accordance with one or more provisioning workflows, a data storage space allocation component 308 configured at least to manage allocation of implementation resources 218 to virtual data stores 212, and a cost tracking component 310 configured at least to track and present costs associated with the virtual data stores 212 and/or the implementation resources 218.

The provisioning interface 304 may include any suitable provisioning interface elements. Examples of suitable provisioning interface elements include interface elements that correspond to requests to provision, configure, reconfigured and/or de-provision the virtual data stores 212 (FIG. 2), as well as interface elements that provide access to virtual data store 212 configuration information, and one or more interface elements enabling authentication to establish authority for such provisioning-related operations. The provisioning interface 304 may incorporate and/or be incorporated in a user interface (UI) such as a graphical user interface (GUI), a Web-based interface, a programmatic interface such as an application programming interface (API) and/or a set of remote procedure calls (RPCs) corresponding to provisioning interface elements, a messaging interface such as a messaging interface in which the interface elements of the provisioning interface 304 correspond to messages of a communication protocol, and/or any suitable combination thereof.

In at least one embodiment, the provisioning interface 304, the data storage space allocation component 308, and the cost tracking component 310 may create, and/or cause the workflow component 306 to create, one or more workflows that are then maintained by the workflow component 306. Workflows, such as provisioning workflows and constraint enforcement workflows, may include one or more sequences of tasks to be executed to perform a job, such as provisioning or constraint enforcement. A workflow, as the term is used herein, is not the tasks themselves, but a task control structure that may control flow of information to and from tasks, as well as the order of execution of the tasks it controls. For example, a workflow may be considered a state machine that can manage and return the state of a process at any time during execution. Workflows may be created from workflow templates. For example, a provisioning workflow may be created from a provisioning workflow template configured with parameters by the data storage space allocation component 308. As another example, a constraint enforcement workflow may be created from a constraint enforcement workflow template configured with parameters by the data storage space allocation component 308.

The workflow component 306 may modify, further specify and/or further configure established workflows. For example, the workflow component 306 may select particular implementation resources 218 (FIG. 2) of the virtual data store service 206 to execute and/or be assigned to particular tasks. Such selection may be based at least in part on the computing resource needs of the particular task as assessed by the workflow component 306. As another example, the workflow component 306 may add additional and/or duplicate tasks to an established workflow and/or reconfigure information flow between tasks in the established workflow. Such modification of established workflows may be based at least in part on an execution efficiency analysis by the workflow component 306. For example, some tasks may be efficiently performed in parallel, while other tasks depend on the successful completion of previous tasks.

As part of provisioning a virtual data store, the provisioning interface 304 and/or the workflow component 306 may request that the data storage space allocation component 308 determine the appropriate set of the implementation resources 218 (FIG. 2) required to implement the virtual data store, determine whether the required implementation resources are available and/or satisfy an associated set of sparse provisioning constraints 312, and/or allocate the required implementation resources. The data storage space allocation component 308 may incorporate any suitable data storage space allocation and/or resource scheduling algorithm. Such algorithms are well known to those of skill in art, and need not be described here in detail.

The sparse provisioning constraints 312 may include any suitable sparse provisioning constraint. Examples of suitable sparse provisioning constraints include constraints with respect to data store utilization metrics 314 including metrics aggregated with respect to customer, customer type, virtual data store type, implementation resource type, and/or the virtual data storage service 206 (FIG. 2), constraints based at least in part on virtual data store type and/or implementation resource type, constraints with respect to requested data storage space size, data store server capacity, allocated data storage space size, and suitable ratios and/or combinations thereof. Sparse provisioning constraints may include any suitable conditions such as compound conditions specified with Boolean operators and conditions specifying that particular numbers, levels, ratios and/or proportions are above a minimum value, below a maximum value and/or within a specified range of values.

The data store utilization metrics 314 may include any suitable utilization metrics for the virtual data stores 212 (FIG. 2) and/or their associated data storage spaces allocated at the sets of data storage servers 220-222. Examples of suitable utilization metrics include amounts of active, inactive, hot and/or cold data storage space, and/or rates of change thereof. Such amounts may be proportions and/or ratios relative to one another and/or to requested virtual data store size. A rate of consumption of a particular virtual data store may correspond to a rate of decrease in an amount of inactive data storage space in the virtual data store. Virtual data stores 212 may be implemented by multiple data storage servers 220-222. Particular data storage servers may participate in the implementation of multiple virtual data stores 212. Further examples of suitable utilization metrics include virtual data store and/or allocated data storage space metrics aggregated with respect to particular data storage servers. In at least one embodiment, the data store utilization metrics 314 include ratios of requested storage space (i.e., for one or more of the virtual data stores 212) to allocated storage space (i.e., at one or more of the data storage servers 220-222) for each of the virtual data stores 212, the data storage servers 220-222, associated data storage spaces and/or sets (including all) thereof. Alternatively, or in addition, the data store utilization metrics 314 may include ratios of available storage space (e.g., maximum available storage space at a particular data storage server and/or a capacity of the data storage server), allocated storage space, and/or active storage space to requested storage space, allocated storage space and/or active storage space. When the data store utilization metrics 314 correspond to sets and/or aggregates, they may be statistical representations such as averages.

The data storage space allocation component 308 may include an activity monitor 316 configured at least to monitor the virtual data stores 212 (FIG. 2), the implementation resources 218 and/or allocated data storage spaces to collect information sufficient to determine the data store utilization metrics 314. The data storage space allocation component 308 may further include an activity classification component 318 configured at least to analyze the information collected by the activity monitor 316 to detect virtual data store 212, implementation resource 218 and/or allocated data storage space utilization patterns correlated with types of activity class (e.g., customer activity class, data storage server activity class). For example, particular utilization patterns may correspond to low, standard, or high activity, and the sparse provisioning constraints 312 may include constraints referencing such activity classes.

The cost tracking component 310 may maintain a cost tracking account for each customer of the virtual data store service 206 (FIG. 2). Utilization and/or costs associated with virtual data stores 212 provisioned by a customer, and/or associated implementation resources 218, may be recorded in the customer's account. The cost tracking component 310 may maintain one or more cost plans 320 specifying how the costs are allocated to the customer's account. The cost tracking component 310 may include an account user interface (UI) component 322 configured at least to provide the customer with one or more presentations of the utilization and/or costs recorded in the customer's account and, when one or more of the costs correspond to a financial balance owed to the virtual data store service 206, one or more mechanisms for settling the account balance (e.g., payment instrument processing). The account UI 322 may further provide for account creation, account configuration and reconfiguration, account details viewing and updating, as well as account deletion. Account (re)configuration may include selection from a qualified list of cost plans 320 when multiple such cost plans 320 are available.

Figure 4:
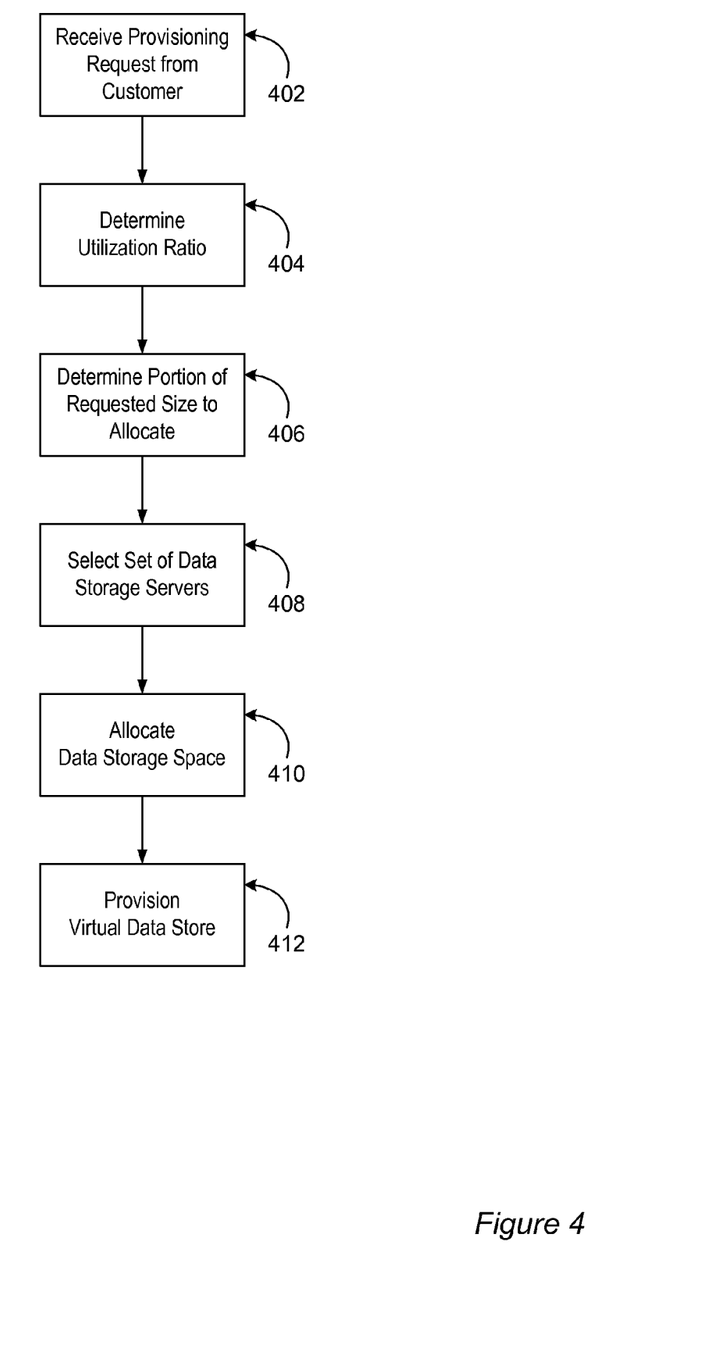
FIG. 4 is a flowchart depicting example steps for sparse provisioning in accordance with at least one embodiment.

The description now turns to example steps and/or procedures that may be performed in accordance with at least one embodiment. FIG. 4 depicts example steps for sparse provisioning in accordance with at least one embodiment. At step 402, a provisioning request may be received from a customer of the virtual data storage service 206 (FIG. 2). For example, a request for a 2 Terabyte volume of a specific type of file system may be received at the provisioning interface 304 of FIG. 3. At step 404, a utilization ratio may be determined. For example, the data storage space allocation component 308 may determine a data store utilization ratio corresponding to the customer that sent the provisioning request of step 402. The data store utilization ratio may be a fixed ratio specified for customers of the virtual data storage service 206. Alternatively, the customer data store utilization ratio may be a utilization ratio determined for the requesting customer based on data store utilization metrics 314 associated with provisioned virtual data stores 212 of the customer and/or a subset of the customers of the virtual data storage service 206. For example, the data storage space allocation component 308 may determine that the requesting customer has an historical volume utilization ratio of 40%. As another alternative, the data store utilization ratio may be a fixed ratio specified for a type of customer including the customer, for example, as determined by the activity classification component 318. The utilization ratio determined at step 404 may correspond to a sparseness prediction with respect to utilization of the requested data storage space.

At step 406, a portion of the requested size to allocate may be determined. The data storage space allocation component 308 (FIG. 3) may determine the portion of the request size to allocate based at least in part on the utilization ratio determined at step 404. For example, the data storage space allocation component 308 may determine that $$40\% \times 2 \text{ Terabytes} = 800 \text{ Gigabytes}$$

Should be initially allocated in response to the request of step 402. At step 408, a set of data storage servers may be selected. For example, the data storage space allocation component 308 may select a subset of a pool of available data storage servers such as the data storage server set 220 (FIG. 2) to maintain a data storage space having the size determined at step 406. In addition, the data storage space allocation component 308 may select the set of data storage servers so as to satisfy the sparse provisioning constraints 312 (or customer-associated subset thereof).

For example, the sparse provisioning constraints 312 (FIG. 3) may specify that data storage servers in the data storage server set 220 (FIG. 2) are each to have an aggregate (with respect to maintained virtual data stores 214) requested storage space to active storage space ratio of no more than 60%. If each data storage server has a data storage capacity of 12 Terabytes, then, in this example, the sparse provisioning constraints 312 specify that virtual data stores maintained by each data storage server are to have an aggregate requested storage space of no greater than $$12 \text{ Terabytes}/60\% = 20 \text{ Terabytes}$$

to ensure that the data storage server set 220 as a whole has the capacity to accommodate activity surges and longer term changes in utilization ratios.

At step 410, the data storage space having the size determined at step 406 may be allocated at (or "charged to") the set of data storage servers selected at step 408. For example, the data storage space allocation component 308 may cause the allocation. At step 412, the virtual data store requested at step 402 may be provisioned. When queried, the provisioned virtual data store may report a size corresponding to the requested size. Alternatively, or in addition, the provisioned virtual data store may report the allocated size and indicate that the balance of the request is requested, pending and/or reserved.

In at least one embodiment, the selection of the set of data storage servers of step 408 may occur subsequent to the virtual data store provisioning of step 412. Furthermore, the portion determination of step 406 and/or the allocation of step 410 may be incorporated into the selection of the data storage servers in accordance with the sparse provisioning constraints 312 (FIG. 3). For example, the sparse provisioning constraints 312 may include, for each of the pool of available data storage servers, a constraint corresponding to $$\sum_{i \in A} X_i s_i(t) \leq C$$

where A is a set of provisioned virtual data stores maintained (at least in part) by a particular data storage server, C is the capacity of the data storage server, $X_i$ is the requested size of virtual data store i in the set of virtual data stores A, and $s_i(t)$ is the sparseness prediction (e.g., utilization ratio estimate) for virtual data store i at a current time t. Since the sparseness prediction $s_i(t)$ can change with time, enforcement of the sparse provisioning constraints 312 (e.g., by the data storage space allocation component 308) may prompt a re-allocation of data storage servers with respect to the set of provisioned virtual data stores A. The sparseness prediction $s_i(t)$ may be a minimum sparseness (e.g., maximum utilization ratio) forecast with a specified statistical confidence (e.g., 90% confidence) within a specified time period (e.g., hours, days, weeks, months) from the current time t based at least in part on monitored activity and/or updated data store utilization metrics 314. The sparseness prediction $s_i(t)$ may be determined with any suitable statistical prediction and/or estimation technique including the method of least squares, Bayesian prediction and Gaussian prediction.

Figure 5:
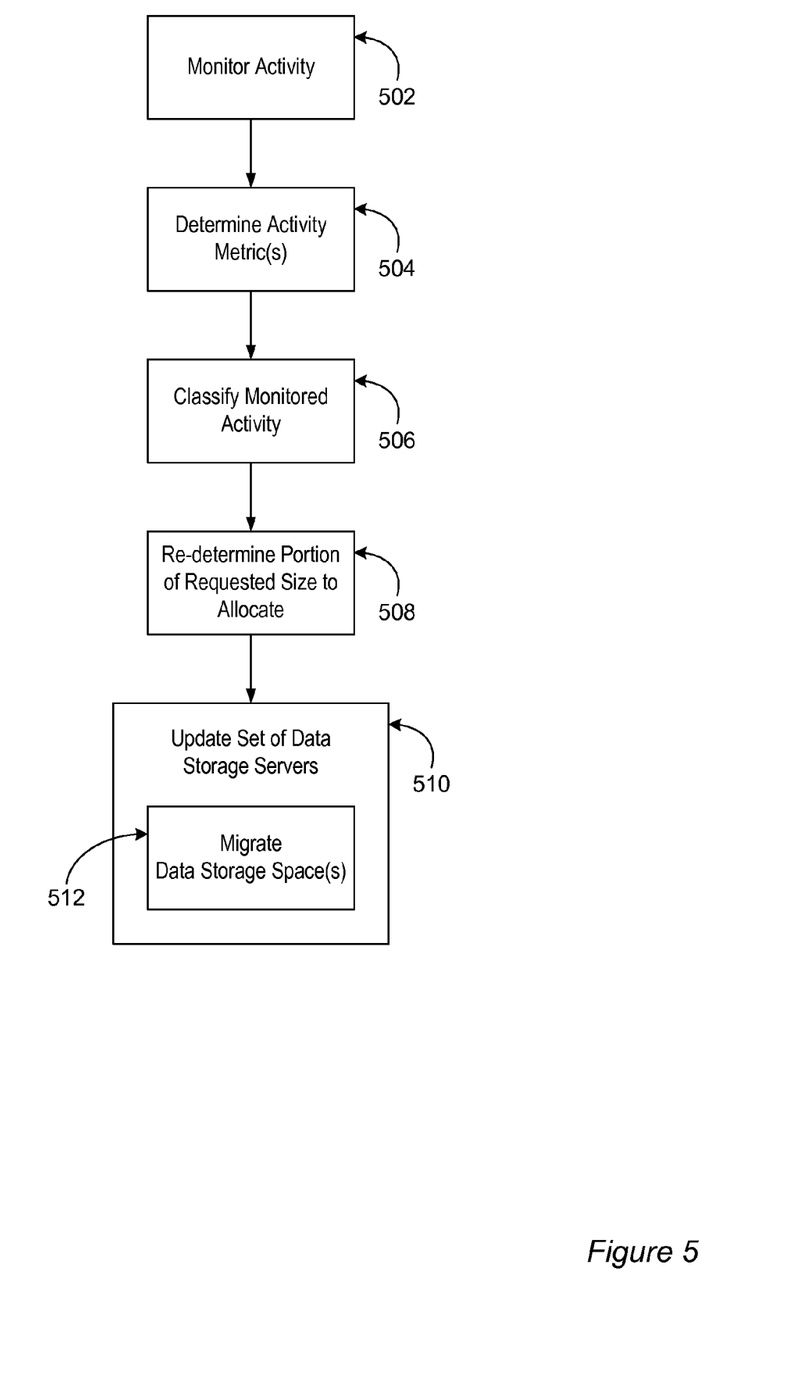
FIG. 5 is a flowchart depicting further example steps for sparse provisioning in accordance with at least one embodiment.

FIG. 5 depicts further example steps for sparse provisioning in accordance with at least one embodiment. At step 502, activity with respect to one or more virtual data stores 212 (FIG. 2), implementation resources 218 and/or allocated data storage spaces may be monitored, for example, by the activity monitor 316 of FIG. 3. At step 504, one or more activity metrics may be determined. For example, the data storage space allocation component 308 may determine a set of the data store utilization metrics 314 based at least in part on the information collected by the activity monitor 316. At step 506, the monitored activity may be classified. For example, the data storage space allocation component 308 may classify the monitored activity with the activity classification component 318 based at least in part on the data store utilization metrics 314.

At step 508, a portion of a requested size associated with a previously allocated data storage space may be re-determined. For example, the data storage space allocation component 308 (FIG. 3) may re-determined the portion of the requested size to allocate based at least in part on the activity metric(s) determined at step 504 and/or the classification determined at step 508. The activity metric(s) and/or the classification may indicate that the initial data storage space allocation is too small (e.g., is being consumed at an above average rate) or too large (e.g., is being consumed at a below average rate). At step 510, the set of data storage servers maintaining the data storage space may be updated accordingly. For example, the data storage space allocation component 308 may add or delete data storage servers from the set. As described above for step 408 of FIG. 4, the data storage space allocation component 308 may update and/or re-select the set of data storage servers in accordance with the sparse provisioning constraints 312 (or customer-associated subset thereof) including migrating one or more data storage spaces (or portions thereof) from one or more of the set of data storage servers (at step 512).

Figure 6:
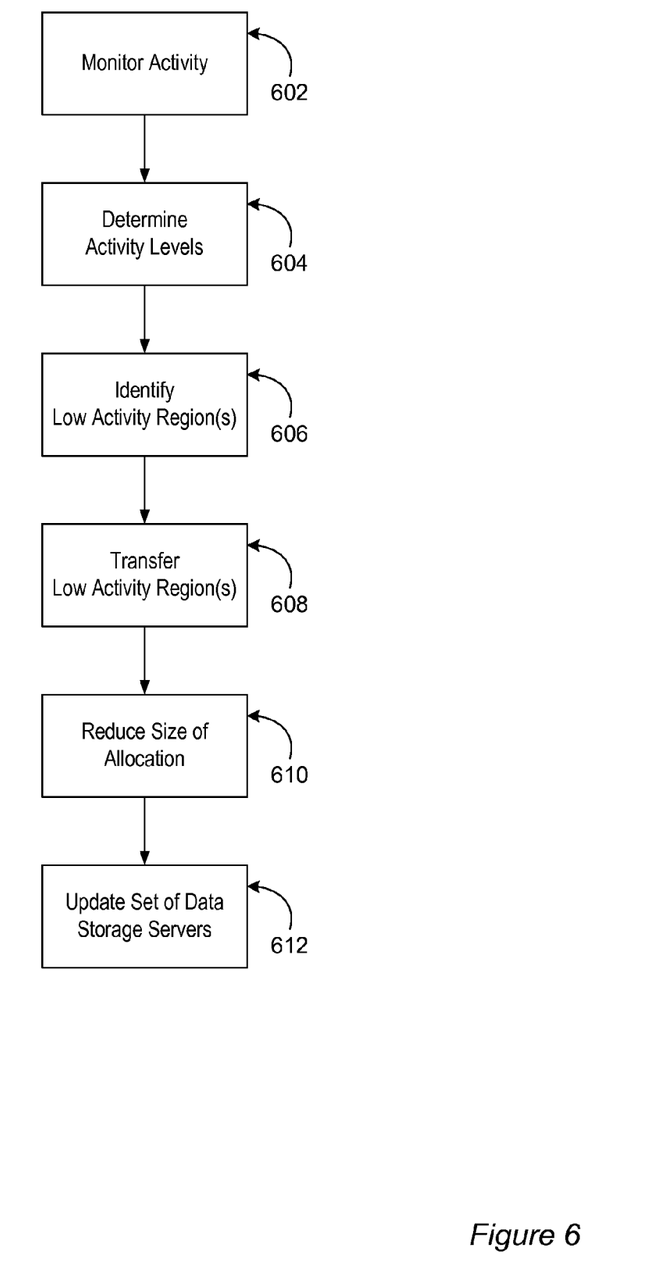
FIG. 6 is a flowchart depicting still further example steps for sparse provisioning in accordance with at least one embodiment.

FIG. 6 depicts still further example steps for sparse provisioning in accordance with at least one embodiment. At step 602, activity in an allocated data storage space may be monitored, for example, by the activity monitor 316 of FIG. 3. At step 604, various activity levels may be determined corresponding to activity in various regions of the data storage space. For example, the data storage space allocation component 308 may determine an access frequency for each region of the data storage space (e.g., by comparison of a "last read" time with the current time) and/or a rate of change of data in each region of the data storage space (e.g., by comparison of a "last updated" time with the current time). At step 606 a set of low activity regions may be identified. For example, the data storage space allocation component 308 may identify regions of the data storage space having an activity level below a specified activity level threshold as low activity regions.

At step 608, the set of low activity regions identified at step 606 may be transferred from the data storage space. For example, the data storage space allocation component 308 may cause the set of low activity regions to be transferred from a high performance and/or high cost virtual data store in the set 214 (FIG. 2) of virtual data stores, to a relatively low performance and/or low cost virtual data store in the set 216 of virtual data stores. At step 610, a size of the allocated data storage space may be reduced. For example, the size of the allocated data storage space may be reduced by the amount of data transferred at step 608. At step 612, the set of data storage servers maintaining the allocated data storage space may be updated as described above for step 510 of FIG. 5.

Figure 7:
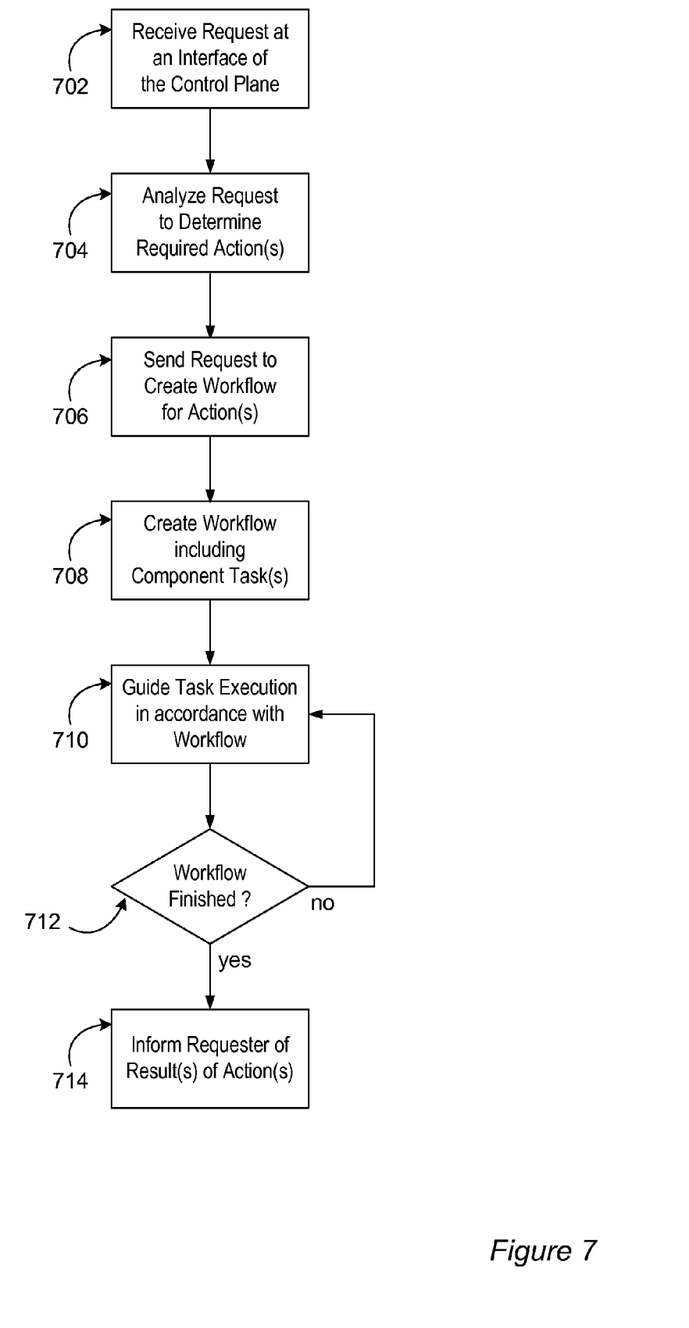
FIG. 7 is a flowchart depicting example steps for workflow in accordance with at least one embodiment.

As described above with reference to FIG. 3, the control plane 302 may be facilitated by one or more workflows maintained by the workflow component 306. FIG. 7 depicts example steps for workflow in accordance with at least one embodiment. At step 702, a request may be received by an interface of the control plane 302. For example, the provisioning interface 304 and/or the account UI 322 of the control plane 302 may receive the request from a customer and/or administrator of the virtual data store service 206 (FIG. 2). The request may be a call to a programmatic interface such as an application programming interface (API) or a Web services interface, e.g., utilizing a Simple Object Access Protocol (SOAP) call. Alternatively, or in addition, the request may be received through a graphical user interface (GUI) such as a Web-based GUI. At step 704, the request may be analyzed to determine one or more actions required to successfully complete the request. For example, the provisioning interface 304 may analyze the request, and determine a set of actions required to provision a set of virtual data stores. When an interface element receiving the request corresponds to a specific action to be performed, the interface may extract information from the request to be utilized in determining aspects and/or parameters of the action to be performed.

At step 706, a request may be sent to create a workflow based at least in part on the one or more actions determined at step 704. For example, the provisioning interface 304 (FIG. 3) may send the request to the workflow component 306. The request to create the workflow may include the action(s), action metadata such as type of action, and/or action parameters. In at least one embodiment, the control plane 302 and/or the workflow component 306 maintains a job queue for such requests, and workflows are created responsive to new additions to the job queue. At step 708, a workflow and one or more component tasks may be created. For example, the workflow component 306 may analyze the request of step 706 to determine the appropriate workflow and component tasks to create.

At step 710, execution of the component task(s) may be guided in accordance with the workflow. For example, the workflow component 306 (FIG. 3) may activate elements of interfaces of the implementation resources 218 (FIG. 2) to provision the set of virtual data stores. Alternatively, or in addition, the workflow component 306 may manage bids for execution of the component task(s) by components of the virtual data store service 206. At step 712, it may be determined whether the workflow has finished. For example, the workflow component 306 may determine whether a final task in a sequence of tasks managed by the workflow has completed. If so, a procedure incorporating step 712 may progress to step 714. Otherwise the procedure may return to step 710 for a next task and/or task sequence. Workflows may guide multiple task sequences executing in parallel. In this case, it may be that the workflow is not finished until each of the multiple task sequences completes and/or an explicit workflow finished flag is set by one of the component tasks. At step 714, the sender of the request of step 702 may be informed of the result(s) of the action(s).

The various embodiments described herein may be implemented in a wide variety of operating environments, which in some cases may include one or more user computers, computing devices, or processing devices which may be utilized to operate any of a number of applications. User or client devices may include any of a number of general purpose personal computers, such as desktop or laptop computers running a standard operating system, as well as cellular, wireless, and handheld devices running mobile software and capable of supporting a number of networking and messaging protocols. Such a system also may include a number of workstations running any of a variety of commercially-available operating systems and other known applications for purposes such as development and database management. These devices also may include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. Such a network may include, for example, a local area network, a wide-area network, a virtual private network, the Internet, an intranet, an extranet, a public switched telephone network, an infrared network, a wireless network, and any combination thereof. The network may, furthermore, incorporate any suitable network topology. Examples of suitable network topologies include, but are not limited to, simple point-to-point, star topology, self organizing peer-to-peer topologies, and combinations thereof.

In embodiments utilizing a Web server, the Web server may run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment may include a variety of data stores and other memory and storage media as discussed above. These may reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device may include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also may include a computer-readable storage media reader, a communications device (e.g., a modem, a network card (wireless or wired), an infrared communication device, etc.), and working memory as described above. The computer-readable storage media reader may be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules including program modules, services, or other elements located within at least one working memory device, including an operating system and application programs, such as a client application or Web browser. It should be appreciated that alternate embodiments may have numerous variations from that described above. For example, customized hardware might also be utilized and/or particular elements might be implemented in hardware, software (including portable software, such as applets), or both. Further, connection to other computing devices such as network input/output devices may be employed.

Storage media and computer readable media for containing code, or portions of code, may include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which may be utilized to store the desired information and which may be accessed by the a system device. Program modules, program components and/or programmatic objects may include computer-readable and/or computer-executable instructions of and/or corresponding to any suitable computer programming language. In at least one embodiment, each computer-readable medium may be tangible. In at least one embodiment, each computer-readable medium may be non-transitory in time. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

The use of the terms "a" and "an" and "the" and similar referents in the context of describing embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope unless otherwise claimed. No language in the specification should be construed as indicating any non-claimed element as essential to the practice of at least one embodiment.

Preferred embodiments are described herein, including the best mode known to the inventors. Variations of those preferred embodiments may become apparent to those of ordinary skill in the art upon reading the foregoing description. The inventors expect skilled artisans to employ such variations as appropriate, and the inventors intend for embodiments to be constructed otherwise than as specifically described herein. Accordingly, suitable embodiments include all modifications and equivalents of the subject matter recited in the claims appended hereto as permitted by applicable law. Moreover, any combination of the above-described elements in all possible variations thereof is contemplated as being incorporated into some suitable embodiment unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method for sparse provisioning in a virtual data storage service, comprising:
    under control of one or more computer systems configured with executable instructions,
        receiving a request to provision a virtual data store having a requested size;
        determining a portion of the requested size to allocate based at least in part on a utilization ratio estimate;
        determining at least one ratio of (i) a requested storage space to (ii) active storage space, the active storage space being maintained by at least one data storage server in a pool of data storage servers;
        selecting at least one data storage server from the pool of data storage servers based at least in part on the portion of the requested size and the at least one ratio;
        allocating a data storage space to be maintained by said at least one data storage server, the data storage space having a size corresponding to the portion of the requested size; and
        provisioning the virtual data store with the data storage space.

2. A computer-implemented method according to claim 1, wherein:
    the virtual data store is one of a plurality of virtual data stores provisioned for a plurality of customers of a distributed data storage service incorporating the pool of data storage servers; and
    the utilization ratio estimate is statistically representative of portions of the plurality of virtual data stores updated during a plurality of time periods.

3. A computer-implemented method according to claim 2, wherein the plurality of time periods corresponding to lifetimes of the plurality of virtual data stores.

4. A computer-implemented method according to claim 1, wherein:
    the virtual data store is one of a plurality of virtual data stores provisioned for one of a plurality of types of virtual data store of a distributed data storage service incorporating the pool of data storage servers; and
    the utilization ratio estimate is statistically representative of portions of the plurality of virtual data stores updated during a plurality of time periods.

5. A computer-implemented method according to claim 1, wherein:
    the virtual data store is one of a plurality of virtual data stores provisioned a customer of a distributed data storage service incorporating the pool of data storage servers; and
    the utilization ratio estimate is statistically representative of portions of the plurality of virtual data stores updated during a plurality of time periods.

6. A computer-implemented method for sparse provisioning in a virtual data storage service, comprising:
    under control of one or more computer systems configured with executable instructions,
        monitoring activity in a first data storage space to identify a plurality of activity levels corresponding to a plurality of regions of the first data storage space, the first data storage space maintained by a first set of data storage servers, wherein activity is monitored at least in part by determining at least one rate of change of data in the plurality of regions of the first data storage space;

identifying at least one low activity region of the plurality of regions of the first data storage space corresponding to a low activity level of the plurality of activity levels;

transferring said at least one low activity region from the first data storage space to a second data storage space maintained by a second set of data storage servers thereby, at least in part, enabling a reduction in an allocated size of the first data storage space; and updating the first set of data storage servers to maintain the first data storage space at the reduced allocated size with a corresponding set of requested storage space to active storage space ratios that satisfy a set of constraints.

7. A computer-implemented method according to claim 6, wherein the low activity level corresponds to a relatively low rate of change of data.

8. A computer-implemented method according to claim 6, wherein the first set of data storage servers collectively provide low latency access to data relative to the second set of data storage servers.

9. A computer-implemented method according to claim 6, wherein at least one of the first set of data storage servers maintains a plurality of data storage spaces including the first data storage space, and the set of constraints includes at least one constraint on at least one of the set of requested storage space to active storage space ratios based at least in part on monitored activity in the plurality of data storage spaces.

10. One or more non-transitory computer-readable media having collectively thereon computer-executable instructions that configure one or more computers to collectively, at least:

provision a plurality of virtual data stores at least in part by allocating a plurality of data storage spaces at a plurality of data storage servers, the plurality of virtual data stores having a plurality of requested sizes, at least one of the plurality of virtual data stores being allocated a data storage space having a size less than the corresponding requested size;

monitor activity in the plurality of data storage spaces, and identify active portions of allocated data storage spaces based at least in part on the monitored activity;

re-allocate at least one of the plurality of data storage spaces to maintain at least one active portion to allocated storage space ratio in accordance with a set of storage space utilization constraints; and migrate at least one of the plurality of data storage spaces from at least one of the plurality of data storage servers to maintain at least one corresponding requested storage space to active storage space ratio in accordance with a set of data storage server utilization constraints.

11. The one or more non-transitory computer-readable media according to claim 10, wherein the set of storage space utilization constraints specifies at least one maximum active portion to allocated storage space ratio.

12. The one or more non-transitory computer-readable media according to claim 11, wherein said at least one maximum active portion to allocated storage space ratio is based at least in part on monitored activity in said at least one of the plurality of data storage spaces.

13. The one or more non-transitory computer-readable media according to claim 12, wherein maintaining said at least one active portion to allocated storage space ratio in accordance with the set of storage space utilization constraints comprises classifying monitored activity in said at least one of the plurality of data storage spaces into at least one of a plurality of activity classes.

14. The one or more non-transitory computer-readable media according to claim 10, wherein the set of data storage server utilization constraints specifies a maximum aggregate requested storage space to active storage space ratio to be enforced at each of the plurality of data storage servers.

15. The one or more non-transitory computer-readable media according to claim 14, wherein the maximum aggregate requested storage space to allocated storage space ratio for at least one of the plurality of data storage servers is based at least in part on aggregate monitored activity at said at least one of the plurality of data storage servers.

16. The one or more non-transitory computer-readable media according to claim 10, wherein the set of data storage server utilization constraints specifies a maximum difference from a requested storage space to active storage space ratio that is statistically representative of a plurality of current requested storage space to active storage space ratios at the plurality of data storage servers.

* * * * *